(12) United States Patent
Oates et al.

(10) Patent No.: US 6,521,696 B2
(45) Date of Patent: *Feb. 18, 2003

(54) AQUEOUS PRESSURE SENSITIVE ADHESIVE FORMULATIONS

(75) Inventors: John D. Oates, Midland, MI (US); Thoi H. Ho, Lake Jackson, TX (US); Wendy D. Hoenig, Lake Jackson, TX (US); David J. Calvert, Haxby (GB)

(73) Assignee: Dow Global Technologies Inc., Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 26 days.

(21) Appl. No.: 09/191,851

(22) Filed: Nov. 12, 1998

(65) Prior Publication Data

US 2002/0061945 A1 May 23, 2002

Related U.S. Application Data

(60) Provisional application No. 60/065,124, filed on Nov. 12, 1997.

(51) Int. Cl.[7] ............................................... C08L 53/00
(52) U.S. Cl. ................... 524/505; 524/167; 524/522; 524/523; 524/528
(58) Field of Search ................................ 524/167, 528, 524/505, 522, 523

(56) References Cited

U.S. PATENT DOCUMENTS

| | | | |
|---|---|---|---|
| 3,418,265 A | 12/1968 | McClain | 260/29.6 |
| 3,734,686 A | 5/1973 | Douglas | 8/137 |
| 4,259,402 A * | 3/1981 | Cobbs, Jr. et al. | 428/310 |
| 4,950,701 A * | 8/1990 | Okamura et al. | 524/237 |
| 5,530,054 A | 6/1996 | Tse et al. | 524/474 |
| 5,548,014 A | 8/1996 | Tse et al. | 524/477 |
| 5,574,091 A | 11/1996 | Walther et al. | 524/570 |
| 5,703,187 A * | 12/1997 | Timmers | 526/282 |
| H1808 H * | 10/1999 | Djiauw et al. | 524/505 |
| 6,120,899 A * | 9/2000 | Cameron et al. | 428/407 |
| 6,162,890 A * | 12/2000 | George et al. | 528/295 |

* cited by examiner

*Primary Examiner*—Peter D. Mulcahy

(57) ABSTRACT

The subject invention pertains to pressure sensitive adhesive formulations comprising an aqueous dispersion of at least one homogeneous ethylene/α-olefin interpolymer or substantially random interpolymer of ethylene and at least one vinylidene aromatic or hindered aliphatic comonomer and at least one surfactant.

15 Claims, No Drawings ately tacky at room temperature
AQUEOUS PRESSURE SENSITIVE ADHESIVE FORMULATIONS This application claims the benefit of U.S. Provisional Application No. 60/065,124, filed Nov. 12, 1997.

FIELD OF THE INVENTION

The subject invention pertains to pressure sensitive adhesive formulations. In particular, the subject invention pertains to water-borne pressure sensitive adhesive formulations comprising at least one homogeneous olefin polymer or at least one substantially random interpolymer of ethylene and a monovinylidene aromatic or hindered aliphatic monomer.

BACKGROUND OF THE INVENTION

Pressure sensitive adhesives (PSA's) are materials which are aggressively and permanently tacky at room temperature at the time of application, and which firmly adhere to a variety of dissimilar surfaces with the application of light pressure, such as pressing with a finger. Despite their aggressive tackiness, PSA's may be removed from smooth surfaces without leaving significant residue. PSA's are widely used in everyday applications, such as masking tape, clear office tape, labels, decals, bandages, decorative and protective sheets (such as shelf and drawer liners), floor tiles, sanitary napkin/incontinence device placement strips, sun control films, and the joining of gaskets to automobile windows.

Historically, pressure sensitive adhesives were based on natural rubber and wood rosins, which were carried by a solvent. Articles bearing such adhesives were manufactured by applying a solution of the adhesive on a suitable backing, and removing the solvent by a devolatizing process. However, in response to cost increases in solvents and regulatory restrictions regarding emissions, water-based adhesives and solid-form hot melt adhesives have been developed.

Water-based adhesives have met with some degree of success in the industry. Exemplary water-based adhesive systems are based on styrene-butadiene, natural rubber, and acrylic latexes. However, improved water-based adhesive systems are sought.

In particular, the industry would find advantage in water-based pressure sensitive adhesive systems which are characterized as having good peel strengths, and which are not susceptible to degradation upon exposure to the elements. Industry would further find advantage in water-based adhesives which provide enhanced adhesion to non-polar substrates.

U.S. Pat. No. 3,734,686 discloses a mechanically stable aqueous emulsion of polyethylene particles having an average molecular weight ranging from about 7,000 to 40,000.

U.S. Pat. No. 3,418,26 teaches that aqueous film-forming ethylene polymer latexes containing ethylene polymer particles of submicron size can be prepared by dispersing in water an ethylene polymer and a water-soluble block copolymer of ethylene oxide and propylene oxide. No examples of stable dispersions of ethylene polymers having a molecular weight above 27,000 are reported.

U.S. Pat. No. 5,574,091 discloses latexes that are film forming at room temperature, and which are prepared from copolymers of ethylene and $C_3$–$C_{20}$ α-olefins higher in molecular weight.

U.S. Pat. No. 5,530,054 claims a hot melt adhesive composition consisting essentially of: (a) 30 to 70 weight percent of a copolymer of ethylene and about 6 to about 30 weight percent of a $C_4$ to $C_{20}$ α-olefin produced in the presence of a catalyst composition comprising a metallocene and an alumoxane and having an $M_w$ of from about 20,000 to about 100,000; and (b) a hydrocarbon tackifier which is selected from a recited list. Exemplified are compositions consisting of 45 weight percent of ethylene/butene-1copolymer having a specific gravity of either 0.898 g/cm³ or 0.901 g/cm³.

U.S. Pat. No. 5,548,014 claims a hot melt adhesive composition comprising a blend of ethylene/α-olefin copolymers wherein the first copolymer has a $M_w$ from about 20,000 to about 39,000 and the second copolymer has a $M_w$ from about 40,000 to about 100,000. Each of the hot melt adhesives exemplified comprises a blend of copolymers, contains 45 weight percent copolymer, with at least one of the copolymers having a polydispersity greater than 2.5. Furthermore, the lowest density copolymer exemplified has a specific gravity of 0.894 g/cm³

SUMMARY OF THE INVENTION

The subject invention provides a pressure sensitive adhesive comprising an aqueous dispersion of:
a. at least one polymer selected from the group consisting of:
  i. homogeneous ethylene/α-olefin interpolymers characterized as having a molecular weight distribution ($M_w/M_n$) of less than 3.5; and
  ii. substantially random interpolymers of ethylene and at least one vinylidene aromatic or hindered aliphatic comonomer;
b. at least one surfactant.

DETAILED DESCRIPTION OF THE INVENTION

The pressure sensitive adhesives of the invention comprise at least one homogeneous ethylene/α-olefin interpolymer which is an interpolymer of ethylene and at least one $C_3$–$C_{20}$ α-olefin and/or at least one substantially random interpolymer of ethylene, a monovinylidene aromatic monomer, and an optional $C_3$–$C_{20}$ α-olefin. The term "interpolymer" is used herein to indicate a copolymer, or a terpolymer, or a higher order polymer. That is, at least one other comonomer is polymerized with ethylene to make the interpolymer.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "monomer residue" or "polymer units derived from such monomer" means that portion of the polymerizable monomer molecule which resides in the polymer chain as a result of being polymerized with another polymerizable molecule to make the polymer chain.

The term "substantially random" in the substantially random interpolymer comprising an α-olefin and a vinylidene aromatic monomer or hindered aliphatic vinylidene monomer as used herein means that the distribution of the monomers of said interpolymer can be described by the Bernoulli statistical model or by a first or second order Markovian statistical model, as described by J.

C. Randall in POLYMER SEQUENCE DETERMINATION, Carbon-13 NMR Method, Academic Press New York, 1977, pages 71–78. Preferably, the substantially random interpolymer comprising an α-olefin and a vinylidene aromatic monomer does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the 13C-NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Density is measured in accordance with ASTM D-792, after annealing for 24 hours.

Melt index ($I_2$) is measured in accordance with ASTM D-1238, Condition 190° C./2.16 kg.

Concerning the Homogeneous Ethylene/α-Olefin Interpolymer

The homogeneous ethylene/α-olefin interpolymer is a homogeneous linear or substantially linear ethylene/α-olefin interpolymer. By the term "homogeneous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), it does not additionally have a distinct lower temperature melting peak.

The homogeneous ethylene/α-olefin interpolymers useful in the invention are characterized as having a narrow molecular weight distribution ($M_w/M_n$). For the homogeneous ethylene/α-olefins useful in the practice of the invention, the $M_w/M_n$ is from 1.5 to 2.5, preferably from 1.8 to 2.2, most preferably about 2.0.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, and the like, the molecular weight distribution $M_w/M_n$. This feature accords substantially linear ethylene polymers with a high degree of processability despite a narrow molecular weight distribution.

It is noted that substantially linear interpolymers useful in the invention differ from low density polyethylene prepared in a high pressure process. In one regard, whereas low density polyethylene is an ethylene homopolymer having a density of from 0.900 to 0.935 g/cm$^3$, the homogeneous linear and substantially linear interpolymers useful in the invention require the presence of a comonomer to reduce the density to less than 0.935 g/cm$^3$.

The long chain branches of substantially linear ethylene interpolymers have the same comonomer distribution as the interpolymer backbone and can be as long as about the same length as the length of the interpolymer backbone. When a substantially linear ethylene/α-olefin interpolymer is employed in the practice of the invention, such interpolymer will be characterized as having an interpolymer backbone substituted with from 0.01 to 3 long chain branches per 1000 carbons.

Methods for determining the amount of long chain branching present, both qualitatively and quantitatively, are known in the art.

For qualitative methods for determining the presence of long chain branching, see, for example, U.S. Pat. Nos. 5,272,236 and 5,278,272. As set forth therein, a gas extrusion rheometer (GER) may be used to determine the rheological processing index (PI), the critical shear rate at the onset of surface melt fracture, and the critical shear stress at the onset of gross melt fracture, which in turn indicate the presence or absence of long chain branching as set forth below.

The gas extrusion rheometer useful in the determination of rheological processing index (PI), the critical shear rate at the onset of surface melt fracture, and the critical shear stress at the onset of gross melt fracture, is described by M. Shida, R. N. Shroff, and L. V. Cancio in Polymer Engineering Science, Vol. 17, No. 11, p. 770 (1977), and in "Rheometers for Molten Plastics" by John Dealy, published by Van Nostrand Reinhold co. (1982) on pages 97–99. GER experiments are performed at a temperature of 190° C., at nitrogen pressures between 250 and 5500 psig (between 1.72 and 37.9 MPa) using a 0.0754 mm diameter, 20:1 L/D die with an entrance angle of 180 degrees.

For substantially linear ethylene interpolymers, the PI is the apparent viscosity (in kpoise) of a material measured by GER at an apparent shear stress of 2.15×10$^6$ dynes/cm$^2$ (0.215 MPa). Substantially linear ethylene interpolymers useful in the invention will have a PI in the range of 0.01 kpoise to 50 kpoise, preferably 15 kpoise or less. Substantially linear ethylene interpolymers have a PI which is less than or equal to 70 percent of the PI of a linear ethylene interpolymer (either a Ziegler polymerized polymer or a homogeneous linear ethylene interpolymer) having the same comonomer or comonomers, and having an $I_2$, $M_w/M_n$, and density, each of which is within 10 percent of that of the substantially linear ethylene interpolymer.

An apparent shear stress versus apparent shear rate plot may be used to identify the melt fracture phenomena and to quantify the critical shear rate and critical shear stress of ethylene polymers. According to Ramamurthy, in the Journal of Rheology, 30(2), 1986, pages 337–357, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described gas extrusion rheometer, the onset of surface melt fracture is characterized as the beginning of losing extrudate gloss at which the surface roughness of the extrudate can only be detected by magnification at 40 times. The critical shear rate at the onset of surface melt fracture for a substantially linear ethylene interpolymer is at least 50 percent greater than the critical shear rate at the onset of surface melt fracture for a linear ethylene polymer having the same comonomer or comonomers and having an $I_2$, $M_w/M_n$ and density within ten percent of that of the substantially linear ethylene polymer.

Gross melt fracture occurs at unsteady extrusion flow conditions and ranges from regular (alternating rough and smooth, helical, etc.) to random distortions. The critical shear stress at the onset of gross melt fracture of substantially linear ethylene interpolymers, especially those having a density greater than 0.910 g/cm$^3$, is greater than 4×10$^6$ dynes/cm$^2$ (0.4 MPa).

The presence of long chain branching may further be qualitatively determined by the Dow Rheology Index (DRI), which expresses a polymer's "normalized relaxation time as the result of long chain branching." (See, S. Lai and G. W. Knight, ANTEC '93 Proceedings, INSITE™ Technology Polyolefins (SLEP)—New Rules in the Structure/Rheology Relationship of Ethylene α-Olefin Copolymers, New Orleans, La., May 1993. DRI values range from 0 for polymers which do not have any measurable long chain branching, such as Tafmer™ products available from Mitsui Petrochemical Industries and Exact™ products available from Exxon Chemical Company) to about 15, and are independent of melt index. In general, for low to medium pressure ethylene polymers, particularly at lower densities, DRI provides improved correlations to melt elasticity and high shear flowability relative to correlations of the same attempted with melt flow ratios. Substantially linear ethylene interpolymers will have a DRI of preferably at least 0.1, more preferably at least 0.5, and most preferably at least 0.8.

DRI may be calculated from the equation:

$$DRI=(3.652879*\tau_o 1.00649/\eta_o - 1)/10$$

where $\tau_o$ is the characteristic relaxation time of the interpolymer and $\eta_o$ is the zero shear viscosity of the interpolymer. Both $\tau_o$ and $\eta_o$ are the "best fit" values to the Cross equation, and the like, $$\eta/\eta_o = 1/(1+(\gamma*\tau_o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a gas extrusion rheometer (GER) at extrusion pressures from 1,000 to 5,000 psi (6.89 to 34.5 MPa), which corresponds a shear stress of from 0.086 to 0.43 MPa, using a 0.0754 mm diameter, 20:1 L/D die at 190° C. Specific material determinations may be performed from 140 to 190° C. as required to accommodate melt index variations.

For quantitative methods for determining the presence of long chain branching, see, for example, U.S. Pat. Nos. 5,272,236 and 5,278,272; Randall (Rev. Macromol. Chem. Phys., C29 (2&3), pages 285–297), which discusses the measurement of long chain branching using $^{13}$C nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pages 103–112, which discuss the use of gel permeation chromatography coupled with a low angle laser light scattering detector (GPC-LALLS) and gel permeation chromatography coupled with a differential viscometer detector (GPC-DV).

A. Willem deGroot and P. Steve Chum, both of The Dow Chemical Company, at the Oct. 4, 1994, conference of the Federation of Analytical Chemistry and Spectroscopy Society (FACSS) in St. Louis, Mo., presented data demonstrating that GPC-DV is a useful technique for quantifying the presence of long chain branches in substantially linear ethylene polymers. In particular, deGroot and Chum found that the presence of long chain branches in substantially linear ethylene polymers correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of log ($I_2$, melt index) as a function of log (GPC weight average molecular weight), as determined by GPC-DV, illustrates that the long chain branching aspects (but not the extent of long chain branching) of substantially linear ethylene polymers are comparable to those of high pressure, highly branched low density polyethylene (LDPE) and are clearly distinct from heterogeneously branched ethylene polymers produced using Ziegler-type catalysts (such as linear low density polyethylene and ultra low density polyethylene) as well as from homogeneous linear ethylene polymers (such as Tafmer™ products available from Mitsui Petrochemical Industries and Exact™ products available from Exxon Chemical Company).

The at least one homogeneous polymer will be an interpolymer of ethylene with at least one comonomer selected from the group consisting of $C_3$–$C_{20}$ α-olefins, non-conjugated dienes, and cycloalkenes. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene. Exemplary cycloalkenes include cyclopentene, cyclohexene, and cyclooctene. The non-conjugated dienes suitable as comonomers, particularly in the making of ethylene/α-olefin/diene terpolymers, are typically non-conjugated dienes having from 6 to 15 carbon atoms. Representative examples of suitable non-conjugated dienes include:

(a) Straight chain acyclic dienes such as 1,4-hexadiene; 1,5-heptadiene; and 1,6-octadiene;

(b) Branched chain acyclic dienes such as 5-methyl-1,4-hexadiene; 3,7-dimethyl-1,6-octadiene; and 3,7-dimethyl-1,7-octadiene;

(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;

(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

One preferred conjugated diene is piperylene. The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene.

The molecular weight of the ethylene/α-olefin interpolymer will be selected on the basis of the desired performance attributes of the pressure sensitive adhesive formulation. It is well known that the molecular weight of the polymer will correlate with the melt viscosity of the polymer. Typically, the ethylene/α-olefin interpolymer will have a molecular weight ($M_w$) of at least 30,000, more preferably at least 50,000, and most preferably at least 75,000, as determined by gel permeation chromatography. Typically, the ethylene/α-olefin interpolymer will have a molecular weight ($M_w$) of no more than 500,000, as determined by gel permeation chromatography.

When the ethylene/α-olefin interpolymer has an ultra-low molecular weight, that is, a number average molecular weight less than 11,000, the ethylene/α-olefin interpolymer leads to a low polymer and formulation viscosity but is characterized by a peak crystallization temperature which is greater than that of corresponding higher molecular weight materials of the same density. In pressure sensitive adhesive applications, the increase in peak crystallization temperature translates to an increased heat resistance. However, as the decreased molecular weight tends to impart to the pressure sensitive adhesives low cohesive strength, when ultra-low molecular weight polymers are employed, they will typically be employed in combination with a higher molecular weight component. For instance, in one embodiment, the pressure sensitive adhesive will comprise a blend of two ethylene copolymers with different molecular weights, one of which has a $M_w$ of at least 50,000 to promote shear bond strength, and the other of which has an $M_w$ of less than 20,000 to impart tack to the system.

Ultra-low molecular weight ethylene/α-olefin interpolymers are more fully described in U.S. patent application Ser. No. 08/784,683, filed on Jan. 22, 1997.

The density of the ethylene/α-olefin interpolymer will likewise be selected on the basis of the desired performance attributes of the adhesive formulation. Typically, however, the ethylene/α-olefin interpolymer will have a density of at least 0.855 g/cm$^3$, preferably at least 0.860 g/cm$^3$. Typically, the ethylene/α-olefin interpolymer will have a density of no more than 0.965 g/cm$^3$, preferably no more than 0.920 g/cm$^3$, more preferably no more than 0.890 g/cm$^3$, and even more preferably no more than 0.880 g/cm$^3$, and most preferably no more than 0.870 g/cm$^3$.

It is contemplated that two or more ethylene/α-olefin interpolymers be employed, wherein one interpolymer has a density which is at least 0.002 g/cm$^3$ greater, typically at least 0.005 g/cm$^3$ greater, than the other interpolymer. Preferably, the density differential between the two interpolymers will be less than 0.04 g/cm$^3$, more preferably less than 0.03 g/cm$^3$.

The ethylene/α-olefin interpolymer will be present in the pressure sensitive adhesive composition of the invention in an amount greater than 5, and preferably greater than 10 weight percent. The ethylene/α-olefin interpolymer will typically be present in the pressure sensitive adhesive composition of the invention in an amount of not more than 90, preferably not more than 80, and more preferably not more than 70 weight percent.

Homogeneously branched linear ethylene/α-olefin interpolymers may be prepared using polymerization processes (for example, as described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. U.S. Pat. No. 4,937,299 to Ewen et al. and U.S. Pat. No. 5,218,071, to Tsutsui et al. disclose the use of catalyst systems based on hafnium for the preparation of homogeneous linear ethylene polymers. Homogeneous linear ethylene/α-olefin interpolymers are currently available from Mitsui Petrochemical Company under the trade name "Tafmer" and from Exxon Chemical Company under the trade name "Exact".

Substantially linear ethylene/α-olefin interpolymers are available from The Dow Chemical Company as Affinity™ polyolefins. Substantially linear ethylene/α-olefin interpolymers may be prepared in accordance with the techniques described in U.S. Pat. No. 5,272,236 and in U.S. Pat. No. 5,278,272.

Ultra-low molecular weight polymers may be made in accordance with the teaching of PCT Publication WO 97/26287, which is equivalent to U.S. patent application Ser. No. 08/784,683, filed on Jan. 22, 1997.

Concerning the Substantially Random Interpolymers

The interpolymers suitable for use in preparing the aqueous dispersions or emulsions of the present invention include, but are not limited to, substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s).

Suitable α-olefin monomers include for example, α-olefin monomers containing from 2 to about 20, preferably from 2 to about 12, more preferably from 2 to about 8 carbon atoms. Preferred such monomers are aliphatic α-olefins such as ethylene, propylene, butene-1, 4-methyl-1-pentene, hexene-1 and octene-1. Most preferred are ethylene or a combination of ethylene with $C_{2-8}$ α-olefins. These α-olefins do not contain an aromatic moiety.

Suitable vinylidene aromatic monomers which can be employed to prepare the interpolymers employed in the blends include, for example, those represented by the following formula:

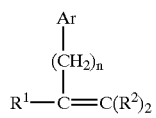

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic monovinylidene monomer is styrene.

By the term "hindered aliphatic or cycloaliphatic vinylidene compounds", it is meant addition polymerizable vinylidene monomers corresponding to the formula:

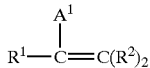

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-Olefin monomers containing from 2 to about 20 carbon atoms and having a linear aliphatic structure such as propylene, butene-1, hexene-1 and octene-1 are not considered as hindered aliphatic monomers. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The number average molecular weight (Mn) of the polymers and interpolymers is usually greater than about 5,000, preferably from about 20,000 to about 1,000,000, more preferably from about 50,000 to about 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinylidene aromatic homopolymer may be formed due to homopolymerization of the vinylidene aromatic monomer at elevated temperatures. The presence of vinylidene aromatic homopolymer is in general not detrimental for the purposes of the present invention and can be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 07/545,403 filed Jul. 3, 1990 (corresponding to EP-A-0,416,815) and in U.S. Pat. No. 5,703,187 which is incorporated herein by reference in its entirety. Preferred operating conditions for such polymerization reactions are pressures from atmospheric up to 3,000 atmospheres (300 MPa) and temperatures from −30° C. to 200° C.

Examples of suitable catalysts and methods for preparing the substantially random interpolymers are disclosed in U.S. application Ser. No. 07/545,403, filed Jul. 3, 1990 corresponding to EP-A-416,815; U.S. application Ser. No. 07/702,475, filed May 20, 1991 corresponding to EP-A-514,828; as well as U.S. Pat. Nos.: 5,721,185; 5,470,993; 5,055,438; 5,057,475; 5,096,867; 5,064,802; 5,132,380; 5,189,192; 5,321,106; 5,347,024; 5,350,723; 5,374,696; 5,399,635; 5,460,993 and 5,556,928, of which the U.S. patents are incorporated herein by reference in their entirety.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, p. 25 (September 1992).

Also suitable are the substantially random interpolymers which comprise at least one α-olefin/vinyl aromatic/vinyl aromatic/α-olefin tetrad disclosed in U.S. application Ser. No. 08/708,809 filed Sep. 4, 1996 by Francis J. Timmers et al. These interpolymers contain additional signals with intensities greater than three times the peak to peak noise. These signals appear in the chemical shift range 43.70–44.25 ppm and 38.0–38.5 ppm. Specifically, major peaks are observed at 44.1, 43.9 and 38.2 ppm. A proton test NMR experiment indicates that the signals in the chemical shift region 43.70–44.25 ppm are methine carbons and the signals in the region 38.0–38.5 ppm are methylene carbons.

In order to determine the carbon-13 NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-[13] NMR peaks but with slightly different chemical shifts.

These interpolymers are prepared by conducting the polymerization at temperatures of from about −30° C. to about 250° C. in the presence of such catalysts as those represented by the formula.

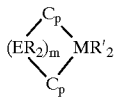

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30, preferably from 1 to about 20, more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst such as, for example, ammonium-, sulfonium-, phosphonium-, oxonium-, ferrocenium-, or silylium-salts of tetrakis (pentafluorophenyl)borate, tris(pentafluorophenyl) borane, an aluminoxane or trialkylaluminum modified aluminoxane, or a combination thereof.

Particularly, suitable substituted cyclopentadienyl groups include those illustrated by the formula:

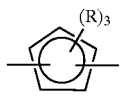

wherein each R is independently, each occurrence, H, hydrocarbyl, silahydrocarbyl, or hydrocarbylsilyl, containing up to about 30, preferably from 1 to about 20, more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-$C_{1-4}$ alkyl, racemic-(dimethylsilanediyl(2-methyl-4-phenylindenyl))zirconium di-$C_{1-4}$ alkoxide or any combination thereof and the like. Also included are the titanium-based catalysts, [N-(1,1-dimethylethyl)-1,1-dimethyl-1-[(1,2,3,4,5-h)-1,5,6,7-tetrahydro-s-indacen-1-yl]silanaminato(2-)-N]titanium dimethyl; (1-indenyl)(tert-butylamido)dimethylsilane titanium dimethyl; ((3-tert-butyl)(1,2,3,4,5-h)-1-indenyl)(tert-butylamido) dimethylsilane titanium dimethyl; and ((3-isopropyl)(1,2,3,4,5-h)-1-indenyl)(tert-butyl amido) dimethylsilane titanium dimethyl, or any combination thereof and the like.

Further preparative methods for the interpolymer component (A) of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc., Div.Polym.Chem.*) Volume 35, pages 686,687 [1994]) have reported copolymerization using a $MgCl2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pages 1071–1083, (1997) have described the influence of polymerization conditions on the copolymerization of styrene with ethylene using $Me_2Si(Me_4Cp)(N\text{-tert-butyl})TiCl_2/\text{methylaluminoxane}$ Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer component are incorporated herein by reference.

The interpolymers which contain hindered cycloaliphatic monomer residues or polymer units derived from such monomer are usually prepared by subjecting an interpolymer containing monovinylidene aromatic monomer residues or polymer units derived from such monomer to hydrogenation thereof converting some or all of the aromatic rings to cycloaliphatic rings which can be saturated (for example, cyclohexane ring) or unsaturated (cyclohexene ring).

The interpolymers of one or more α-olefins and one or more monovinylidene aromatic monomers and/or one or more hindered aliphatic or cycloaliphatic vinylidene monomers employed in the present invention are substantially random polymers.

These interpolymers usually contain from about 0.5 to 65 mole percent of at least one vinylidene aromatic monomer and/or hindered aliphatic or cycloaliphatic vinylidene monomer, with interpolymers having from 0.5 to 18 mole percent of the vinylidene aromatic monomer and/or hindered aliphatic or cyloaliphatic vinylidene monomer exhibiting semicrystalline behavior, interpolymers having from greater than 18 to 25 mole percent of the vinylidene aromatic monomer and/or hindered aliphatic or cycloaliphatic vinylidene monomer exhibiting elastomeric behavior, and with interpolymers having from greater than 25 to 65 mole percent of the vinylidene aromatic monomer and/or hindered aliphatic or cycloaliphatic vinylidene monomer exhibiting glassy behavior.

Concerning the Polymerization of the Homogeneous Ethylene/α-Olefin Interpolymer and the Substantially Random Interpolymer The homogeneous ethylene/α-olefin interpolymer or substantially random interpolymer of ethylene, a vinylidene aromatic monomer, and an optional $C_3$–$C_{20}$ α-olefin, may be suitably prepared using a single site metallocene or a constrained geometry metal complex. Constrained geometry catalysts are disclosed in U.S. application Ser. No. 545,403, filed Jul. 3, 1990 (EP-A-416,815); U.S. application Ser. No. 702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Ser. No. 720,041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts.

Suitable activating cocatalysts and activating techniques have been previously taught with respect to different metal complexes in the following references: EP-A-277,003, U.S. Pat. Nos. 5,153,157, 5,064,802, 5,721,185, 5,372,682, 5,350,723, and EP-A-468,651 (equivalent to U. S. Ser. No. 07/547,718).

Catalysts found to be particularly suitable in the preparation of substantially linear ethylene/α-olefin interpolymers include, for instance, the catalysts described in the Examples set forth below, as activated by trispentafluorophenylborane and triisobutylaluminum modified methylalumoxane cocatalysts.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from about 1:3:5.

A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30. In most polymerization reactions the molar ratio of catalyst:polymerizable compounds employed is from $10^{-12}$:1 to $10^{-1}$:1, more preferably from $10^{-9}$:1 to $10^{-5}$:1.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of a dry, inert gas such as, for example, nitrogen.

The polymerization may be carried out as a batchwise or a continuous polymerization process, with continuous polymerization processes being required for the preparation of substantially linear polymers. In a continuous process, ethylene, comonomer, and optionally solvent and diene are continuously supplied to the reaction zone and polymer product continuously removed therefrom.

In general, the first polymer may be polymerized at conditions for Ziegler-Natta or Kaminsky-Sinn type polymerization reactions, that is, reactor pressures ranging from atmospheric to 3500 atmospheres. The reactor temperature should be greater than 80° C., typically from 100° C. to 250° C., and preferably from 100° C. to 150° C., with temperatures at the higher end of the range, and the like, temperatures greater than 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be 0:1. When the desired polymer has an $I_2$ of 1000 g/10 min., the hydrogen:ethylene molar ratio will typically be from 0.45:1 to 0.7:1. The upper limit of the hydrogen:ethylene molar ratio is from 2.2 to 2.5:1.

Generally the polymerization process is carried out with a differential pressure of ethylene of from 10 to 1000 psi (70 to 7000 kPa), most preferably from 40 to 60 psi (30 to 300 kPa). The polymerization is generally conducted at a temperature of from 80 to 250° C., preferably from 90 to 170° C., and most preferably from greater than 95° C. to 140° C.

In most polymerization reactions the molar ratio of catalyst:polymerizable compounds employed is from $10^{-12}$:1 to $10^{-1}$:1, more preferably from $10^{-9}$:1 to $10^{-5}$:1. Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The ethylene/α-olefin interpolymer may alternatively be prepared in a gas phase polymerization process, using the catalysts as described above as supported in an inert support, such as silica. The ethylene/α-olefin interpolymer may further be made in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

Optional Modification of the Homogeneous Ethylene/α-Olefin Interpolymer or Substantially Random Interpolymer by the Formation of Heteromorphic Long Chain Branching The homogeneous ethylene/α-olefin polymer or substantially random interpolymer may optionally be modified, such as grafting onto it a higher density polymer. Heteromorphic polymer compositions are disclosed and claimed in PCT Application WO 98/32784.

Exemplary heteromorphic compositions will comprise: (A) a homogeneous ethylene/α-olefin or substantially random interpolymer backbone; and (B) an ethylene homopolymer, an ethylene/α-olefin interpolymer, or a substantially random interpolymer which is appended from the interpolymer backbone and which has a density which is at least 0.004 g/cm³ greater than that of the first interpolymer backbone. Preferably, the heteromorphic composition will comprise: (A) a homogeneous ethylene/α-olefin interpolymer backbone; and (B) an ethylene homopolymer or an ethylene/α-olefin interpolymer which is appended from the interpolymer backbone and which has a density which is at least 0.004 g/cm³ greater than that of the first interpolymer backbone. Such polymer compositions will resist deformation under high temperatures better than a comparative physical blend or inreactor blend of the first and second interpolymers. Such improved high temperature performance is reflected in higher under load service temperature (ULST) values, that is, the tendency of the heteromorphic polymer compositions to fail due to softening/melting, as measured using a Rheometrics Solids Analyzer.

While not wishing to be bound by theory, it is believed that the lower density backbone polymer acts as a soft segment to provide flexibility at room temperature of the heteromorphic polymer composition. The grafting of a hard segment, such as high density polyethylene, which has a higher crystalline melting point, improves the creep resistance of the pressure sensitive adhesive, since the hard segments cocrystallize into their own small interspersed domains and serve to tie the elastomer chains into a three dimensional network.

The ethylene/α-olefin interpolymer (A) which constitutes the backbone of the heteromorphic olefin polymer of the invention will be a homogeneous linear ethylene/α-olefin interpolymer, a substantially linear ethylene/α-olefin interpolymer, or a substantially random interpolymer, (preferably a homogeneous linear ethylene/α-olefin interpolymer or a substantially linear ethylene/α-olefin interpolymer) all of which are described in greater detail above.

The density of the backbone polymer depends on the type and amount of comonomer used. The density may be controlled according to method know to those skilled in the art, in order to control the softness of the polymer over the range from highly amorphous, elastomeric grades to highly crystalline, nonelastomeric grades. The choice of backbone polymer density will depend on the requirements of each application according to the performance requirements known to those skilled in the art. Typically, however, the density of the backbone polymer will be less than 0.920 g/cm$^3$, preferably less than 0.900 g/cm$^3$, more preferably less than 0.880 g/cm$^3$. In applications where the best elastomeric properties are required, the density of the backbone polymer will be less than 0.870 g/cm$^3$, preferably less than 0.865 g/cm$^3$, with densities as low as 0.855 g/cm$^3$ being achievable.

The molecular weight of the backbone polymer may likewise vary according to each system. When the branch polymer is attached to the backbone polymer by crosslinking or grafting, it may be preferred to reduce the molecular weight of the backbone interpolymer to reduce gelation, particularly if the branch polymer is high molecular weight or multifunctional in reactive sites. It is an aspect of this invention that excellent physical properties may be obtained even with relatively low molecular weight backbone polymers due to the optimized connectivity afforded by the heteromorphic character of the compositions of the invention. Thus, it is possible to obtain good physical properties and good processability simultaneously.

Typically, however, the backbone polymer will have a melt index ($I_2$) of from 0.01 to 10,000 g/10 min., and preferably from 0.01 to 1,000 g/10 min. Especially preferred melt indices are greater than 10 g/10 min., more preferably greater than 20 g/10 min. Note that for low molecular weight polymers, i.e., polymers having a melt index greater than 1000 g/10 min., molecular weight may be indicated rather by measuring the melt viscosity of the polymer at 350° F. The melt viscosities at 350° F. of polymers having melt indices of 1000 g/10 min. and 10,000 g/10 min., as measured by the technique set forth in the Test Procedures section below, are approximately 8200 and 600 centipoise respectively.

The branch polymer (B) which appends from polymer backbone (A) may be any polymer that can be copolymerized with the monomers during production of the backbone polymer, or that may be grafted or crosslinked with the backbone polymer, and that has a density which is at least 0.004 g/cm$^3$, preferably at least 0.006 g/cm$^3$, more preferably at least 0.01 g/cm$^3$ greater than that of the backbone polymer. Preferably, the branch polymer (B), in its pure state, will have a glass transition temperature (Tg) or crystalline melting point (Tm) which is at least 10° C., preferably 20° C., and most preferably at least 50° C. higher than the Tg or Tm (whichever is higher) of the backbone polymer in its pure state. Note that for the purpose of this invention, the term "grafting" means linking one endgroup of the branch polymer to the backbone polymer, while the term "crosslinking" means, in a limited fashion, connecting via one or more linkages elsewhere along the long-chain branch precursor (e.g., not an endgroup) to form the heteromorphic long chain branched composition rather than a crosslinked network.

Non-limiting examples of heteromorphic long-chain branch materials include heterogeneously and homogeneously branched linear ethylene homopolymers and ethylene/α-olefin interpolymers, as well as substantially linear ethylene homopolymers and ethylene/α-olefin interpolymers, each of which is described in more detail below. Such branch polymers may further optionally be functionalized.

The heteromorphic long-chain branch will further be of sufficient molecular weight to be able to cocrystallize or form a phase with other branch polymer molecules or additionally added polymer. Preferably, the heteromorphic long-chain branch will have a weight average molecular weight ($M_w$) of at least 1000, preferably at least 3000, as measured in accordance with the procedures set forth in the Test Methods section below.

The amount of backbone polymer should be sufficient to make it the continuous or co-continuous phase in the mixture of backbone polymer and heteromorphic long-chain branch polymer. In particular, the ratio by weight of backbone polymer to branch polymer will generally be greater than 1:3, preferably at least 1:2, and most preferably greater than 1:1. Those skilled in the art will recognize that the optimum ration will vary with application and resultant changes in preferences for elastomer properties, high temperature properties, modulus/stiffness, etc.

The average number of heteromorphic long chain branches per polymer backbone molecule will be sufficient to provide to the final polymer composition an improvement in temperature resistance as measured by RSA and/or an improvement in tensile strength that is greater than that provided by a simple physical blend of comparable polymers without copolymerization, grafting, or crosslinking. Preferably, the compositions of the invention will exhibit a temperature resistance as measured by RSA of at least 10° C., preferably at least 15° C. greater than that of a physical blend of comparable polymers. Preferably, the heteromorphic compositions of the invention will exhibit an ultimate tensile strength which is at least 70 percent that of the physical blend of comparable polymers, more preferably at least 85 percent, most preferably which equals or exceeds that of the physical blend of comparable polymers, with ultimate tensile strengths which are 120 percent of the physical blend of comparable polymers being easily attained.

The average number of heteromorphic long chain branches per polymer backbone molecule, however, will not be so great as to reduce the elastomeric properties of the polymer backbone to an unacceptable level. For instance, when the backbone polymer has a density of less than 0.900 g/cm$^3$, the composition of the invention will preferably exhibit a percent elongation which is at least 40 percent, more preferably which is at least 50 percent, even more preferably which is at least 60 percent that of the blend of comparable polymers, with compositions exhibiting percent elongations which equal or exceed that of the comparable blend being easily achieved.

In one embodiment, the higher crystallinity branch polymer and the lower crystallinity backbone polymer will be prepared by reacting previously prepared and isolated polymer reactants. In this case, the higher crystallinity branch polymer will react to form a T-link (by grafting) or an H-link (by light crosslinking) with the lower crystallinity backbone polymer. This reaction may be accomplished by methods known to those skilled in the art.

In one embodiment, hydrogen will be abstracted from the polymer backbone, and will react with the branch polymer. Methods for abstracting hydrogen from the polymer backbone include but are not limited to reaction with free radicals which are generated by homolytically cleaving molecules (e.g., peroxide-containing compounds, azo-containing compounds, etc.), radiation, etc.

The presence of olefinic unsaturation on the backbone polymer or branch polymer can help control the location of the grafting/crosslinking sites. For example, peroxide decomposition in the presence of a major fraction of a saturated backbone polymer and a minor fraction of vinyl-terminated branch polymer will tend to graft the branch polymer onto the backbone polymer, whereas a vinyl-free branch polymer can undergo hydrogen abstraction to produce a radical which will react with that of the backbone polymer to form H-links. Vinyl-terminated branch polymers are prepared by adjusting reactor conditions such that the polymerizing chains are terminated by beta-hydride elimination, rather than being hydrogen terminated. In addition, coagents such as mono-, di- or tri-allyl functional molecules (e.g., triallyl cyanurate) may be used to further control the free radical processes. In general, grafting is preferred over light crosslinking, since more heteromorphic long-chain branches may be incorporated without gelation.

Use of $\alpha,\Omega$-dienes as a comonomer in the formation of the higher branch-forming polymer or in the backbone-forming polymer will increase the reactivity of that polymer component. Suitable $\alpha,\Omega$-dienes include 1,7-octadiene and 1,9-decadiene. When incorporated, such dienes will typically be present in an amount less than 2 per polymer chain.

The crosslinking or grafting reactions may be carried out in a solution of the two polymers in an appropriate solvent or in a melt blend of the polymer components. The latter is the preferred method. Melt blending can be done in a batch mixer such as a Brabender mixer, Banbury mixer, roll mill, or in a continuous mixer such as a Farrell Continuous Mixer, or in a single or twin screw extruder. It is also possible to form a mixture of the polymers, then irradiate or imbibe with reactive solution (such as peroxide) and heat. However, melt or solution blending is preferred over these approaches.

In an alternate embodiment, heteromorphic polymer compositions may be prepared by copolymerizing the branch polymer with monomers that make the backbone polymer. With a dual catalyst system, it is envisioned that the backbone polymer and the subject composition (e.g., the heteromorphic polymer composition) could be copolymerized simultaneously. This method has the advantage of minimizing phase-out of high Tg/Tm polymer in a relatively cold reactor.

In an alternate embodiment, the heteromorphic compositions may be produced in a series dual reactor arrangement whereby the branch polymer is made in the first reactor and then fed into a second reactor where it is copolymerized with the monomers which form the backbone polymer to make the subject composition. The second reactor should be maintained at a temperature which is greater than that at which the higher crystallinity branch polymer would phase separate from the lower crystallinity backbone polymer. It is preferred that the reactor in which the copolymerization takes place be a reactor with a high polymer ("solids") concentration, such as a loop reactor, to maximize the concentration of polymerizable higher crystallinity branch polymer in the reactor.

Optional Modification of the Homogeneous Ethylene/$\alpha$-Olefin Interpolymer or Substantially Random Interpolymer by the Post-Reactor Coupling Optionally, the homogeneous ethylene/$\alpha$-olefin polymer or substantially random interpolymer may be post-reactor treated to further increase the molecular weight, such as by coupling. Suitable coupling agents include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seern, Vol. 1, Wiley-Interscience, 1970).

Suitable peroxides include aromatic diacyl peroxides; aliphatic diacyl peroxides; dibasic acid peroxides; ketone peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxide; tert-butylperbenzoate; tert-butylcumylperoxide; 2,5-bis (t-butylperoxy)-2,5-dimethylhexyne; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethylcyclohexane; lauroyl peroxide; succinic acid peroxide; cyclohexanone peroxide; t-butyl peracetate; butyl hydroperoxide, etc.

Suitable phenols are disclosed in U.S. Pat. No. 4,311,628, the disclosure of which is incorporated herein by reference. One example of a phenolic coupling agent is the condensation product of a halogen substituted phenol or a $C_1$–$C_{10}$ alkyl substituted phenol with an aldehyde in an alkaline medium, or by condensation of bifunctional phenoldialcohols. One such class of phenolic coupling agents is dimethylol phenols substituted in the para position with $C_5$–$C_{10}$ alkyl group(s). Also suitable are halogenated alkyl substituted phenol curing agents, and coupling systems comprising methylol phenolic resin, a halogen donor, and a metal compound.

Suitable azides include azidoformates, such as tetramethylenebis(azidoformate) (see, also, U.S. Pat. No. 3,284,421, Breslow, Nov. 8, 1966); aromatic polyazides, such as 4,4'-diphenylmethane diazide (see, also, U.S. Pat. No. 3,297,674, Breslow et al., Jan. 10, 1967); and sulfonazides, such as p,p'-oxybis(benzene sulfonyl azide).

The poly(sulfonyl azide) is any compound having at least two sulfonyl azide groups (—$SO_2N_3$) reactive with the homogeneous ethylene/$\alpha$-olefin interpolymer or substantially random interpolymer. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the homogeneous ethylene/α-olefin interpolymer or substantially random interpolymer and the sulfonyl azide, more preferably at least 1, more preferably at least 2, most preferably at least 3 carbon, oxygen or silicon, preferably carbon, atoms between functional groups. The term inertly substituted refers to substitution with atoms or groups which do not undesirably interfere with the desired reaction(s) or desired properties of the resulting coupled polymers. Such groups include fluorine, aliphatic or aromatic ether, siloxanes, as well as sulfonyl azide groups when more than two homogeneous ethylene/α-olefin interpolymer or substantially random interpolymer chains are to be joined. Suitable structures include R as aryl, alkyl, aryl alkaryl, arylalkyl silane, or heterocyclic, groups and other groups which are inert and separate the sulfonyl azide groups as described. More preferably R includes at least one aryl group between the sulfonyl groups, most preferably at least two aryl groups (such as when R is 4,4'diphenylether or 4,4-biphenyl). When R is one aryl group, it is preferred that the group have more than one ring, as in the case of naphthylene bis(sulfonyl azides). Poly(sulfonyl)azides include such compounds as 1,5-pentane bis(sulfontlazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

The poly(sulfonyl azide) is used in an effective amount, that is an amount effective to couple the homogeneous ethylene/α-olefin interpolymer or substantially random interpolymer as compared with the unmodified, that is sufficient poly(sulfonyl azide) to result in the formation of less than 10 weight percent gels, preferably less than 5 weight percent gels, more preferably less than 3 weight percent gels, as evidenced by insolubility of the gels in boiling xylene when tested according to ASTM D-2765A-84. The amount is preferably at least about 0.01, more preferably at least about 0.05, most preferably 0.3 weight percent poly(sulfonyl azide) based on total weight of homogeneous ethylene/α-olefin interpolymer or substantially random interpolymer, with these values depending on the molecular weight of the azide and the molecular weight or melt index of the homogeneous ethylene/α-olefin interpolymer or substantially random interpolymer.

For coupling, the sulfonyl azide is admixed with the homogeneous ethylene/α-olefin interpolymer or substantially random interpolymer and heated to at least the decomposition temperature of the sulfonyl azide, that is usually greater than 100° C. and most frequently greater than 150° C. The preferred temperature range depends on the nature of the azide that is used. For example, in the case of 4,4'-disulfonylazidediphenylether the preferred temperature range is greater than about 150° C., preferably greater than about 160° C., more preferably greater than about 185° C., most preferably greater than 190° C. Preferably, the upper temperature is less than 250° C.

Alternatively, silane coupling agents may be employed. In this regard, any silane that will effectively graft to and couple the homogeneous ethylene/α-olefin interpolymers or substantially random interpolymers can be used in the practice of this invention. Suitable silanes include unsaturated silanes that comprise an ethylenically unsaturated hydrocarbyl group, such as vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, γ-(meth) acryloxy propyl trimethoxy silane and mixtures of these silanes are the preferred silane coupling agents for use in this invention.

Description of Tackifier and Plasticizer Components

Typically, the type and amount of tackifier and oil are added to the pressure sensitive adhesives such that the storage modulus (G') and glass transition temperature (Tg) of pressure sensitive adhesive are $1 \times 10^4$ to $1 \times 10^7$ dynes/cm$^2$ (1 kPa to 1 MPa) and $-30°$ C. to 20° C., respectively, as determined by dynamical mechanical spectroscopy (DMS).

As used herein, the term "tackifier" means any of the compositions described below which are useful to impart tack to the hot melt adhesive composition. ASTM D-1878-61T defines tack as "the property of a material which enables it to form a bond of measurable strength immediately on contact with another surface".

The pressure sensitive adhesive composition of the invention will typically comprise at least 5 weight percent tackifier, typically at least 10 weight percent tackifier, and more preferably at least 20 weight percent tackifier. Likewise, the pressure sensitive adhesive composition of the invention will typically comprise no more than 70 weight percent tackifier, preferably no more than 60 weight percent tackifier, and more preferably no more than 50 weight percent tackifier.

A description of tackifiers is set forth in "Handbook of Pressure Sensitive Adhesive Technology", edited by D. Satas, Van Nostrand Reinhold, New York, Chapter 20, page 527. In general terms, the tackifying resins useful in the pressure sensitive adhesive compositions of the invention comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the pressure sensitive adhesive compositions of this invention. Representative examples of useful hydrocarbon resins includes alph-methyl styrene resins, branched and unbranched $C_5$ resins, $C_9$ resins, $C_{10}$ resins, as well as styrenic and hydrogenated modifications of such.

Tackifying resins range from being a liquid at 37° C. to having a ring and ball softening point of about 135° C. Solid tackifying resins with a softening point greater than about 100° C., more preferably with a softening point greater than about 130° C. are particularly useful to improve the cohesive strength of the pressure sensitive adhesive compositions of the present invention, particularly when only a single homogeneous ethylene/α-olefin interpolymer is utilized.

For the pressure sensitive adhesive compositions of the invention, the preferred tackifying resin is predominantly aliphatic. However, tackifying resins with increasing aromatic character are also useful, particularly when a second tackifier or mutually compatible plasticizer is employed.

A plasticizer is typically employed to reduce the modulus and viscosity of the pressure sensitive adhesive. A plasticizer is broadly defined as a typically organic composition that can be added to thermoplastics, rubbers and other resins to improve extrudability, flexibility, workability, or stretchability. In preferred embodiments of the invention, the plasticizer will be provided to the pressure sensitive adhesive composition in amounts up to 90 weight percent, preferably less than 30 weight percent of the pressure sensitive adhesive composition. The plasticizer may be either a liquid or a solid at ambient temperature.

Exemplary liquid plasticizers include hydrocarbon oils, polybutene, liquid tackifying resins, and liquid elastomers. Plasticizer oils are primarily hydrocarbon oils which are low in aromatic content and which are paraffinic or naphthenic in character. Plasticizer oils are preferably low in volatility, transparent and have as little color and odor as possible. The use of plasticizers in this invention also contemplates the use of olefin oligomers, low molecular weight polymers, vegetable oils and their derivatives and similar plasticizing liquids.

Description of the Optional Wax and Other Optional Polymer Components

Waxes may be usefully employed in the pressure sensitive adhesive compositions of the present invention, particularly when it is desired to promote creep resistance. Waxes are commonly used to modify the viscosity and reduce tack at concentrations up to 60 percent by weight, preferably less than about 25 percent by weight, more preferably 10 percent by weight. Waxes useful in the pressure sensitive adhesive compositions of the present invention include paraffin waxes, microcrystalline waxes, Fischer-Tropsch, polyethylene and by-products of polyethylene wherein $M_w$ is less than 3000. More preferably, the concentration of wax is less than 35 percent by weight for high melt point waxes. At wax concentrations above 35 percent by weight, paraffin waxes are typically used.

Also suitable are ultra-low molecular weight ethylene/α-olefin interpolymers prepared using a constrained geometry catalyst, and may be referred to as homogeneous waxes. Such homogeneous waxes, as well as processes for preparing such homogeneous waxes, are set forth in the Examples below. Homogeneous waxes, in contrast to paraffinic waxes and crystalline ethylene homopolymer or interpolymer waxes, will have a $M_w/M_n$ of from 1.5 to 2.5, preferably from 1.8 to 2.2.

Homogeneous waxes will be either ethylene homopolymers or interpolymers of ethylene and a $C_3$–$C_{20}$ α-olefin. The homogeneous wax will have a number average molecular weight less than 6000, preferably less than 5000. Such homogeneous waxes will typically have a number average molecular weight of at least 800, preferably at least 1300.

Homogeneous waxes lead to a low polymer and formulation viscosity, but are characterized by peak crystallization temperatures which are greater than the peak crystallization temperatures of corresponding higher molecular weight materials of the same density. In polymeric binding applications, the increase in peak crystallization temperature translates to an increased heat resistance, and the like, improved creep resistance, and improved shear adhesion failure temperatures.

In certain embodiments, the wax will have pendant acid functionality moieties. Any unsaturated organic compound containing at least one ethylenic unsaturation (e.g., at least one double bond), at least one carbonyl group (—C=O), and that will graft to a substantially linear ethylene polymer as described above can be used in the practice of this invention. Representative of compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound content of the wax is at least about 0.01 weight percent, and preferably at least about 0.05 weight percent, based on the combined weight of the polymer and the organic compound. The maximum amount of unsaturated organic compound content can vary to convenience, but typically it does not exceed about 10 weight percent, preferably it does not exceed about 5 weight percent, and more preferably it does not exceed about 2 weight percent.

The unsaturated organic compound can be grafted to the wax by any known technique, such as those taught in U.S. Pat. Nos. 3,236,917 and 5,194,509 which are incorporated into and made a part of this application by reference. For example, in the '917 patent the polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g., 210 to 300° C., and a free radical initiator is not used or is used at a reduced concentration.

An alternative and preferred method of grafting is taught in U.S. Pat. No. 4,950,541, the disclosure of which is incorporated into and made a part of this application by reference, by using a twin-screw devolatilizing extruder as the mixing apparatus. The wax and unsaturated organic compound are mixed and reacted within the extruder at temperatures at which the reactants are molten and in the presence of a free radical initiator. Preferably, the unsaturated organic compound is injected into a zone maintained under pressure within the extruder.

In another embodiment, the pressure sensitive adhesives of the invention will contain an additional polymer component, to the extent it does not detrimentally affect the properties of the adhesive system. Exemplary additional polymers include natural rubber, styrene butadiene copolymer, polyacrylates, styrene block copolymers (such as SBS, SEBS, SIS), ethylene acrylic acid copolymers, and various blends thereof.

Description of Other Optional Additives

As is known in the art, various other components can be added to modify the tack, color, odor, etc., of the pressure sensitive adhesive composition. Additives such as antioxidants (for example, hindered phenolics (for example, Irganox∪ 1010, Irganox™ 1076), phosphites (for example, Irgafos™ 168)), antiblock additives, pigments, and fillers, can also be included in the formulations. It is generally preferred that the additives should be relatively inert and have negligible effects upon the properties contributed by the homogeneous linear or substantially linear interpolymer, tackifying agent, and plasticizing oil.

Preparation of Pressure Sensitive Adhesive Formulations

The latexes (dispersions or emulsions) of the present invention are prepared in the presence of a stabilizing and an emulsifying amount of a suitable surfactant. The surfactant used to form the aqueous dispersion may be anionic, cationic or nonionic. The surfactants may also be a combination of anionic and nonionic, anionic and anionic, nonionic and nonionic, cationic and cationic, or cationic and nonionic surfactants.

Examples of such surfactants include sulfonates of an alkylphenyl moiety represented by the formula:

$$X\text{-}\Phi\text{-}SO_3^-Z^+$$

wherein X is a C6–C18 linear or branched alkyl group, preferably decyl, dodecyl or tridecyl, more preferably dodecyl; $\Phi$ is phenylene, preferably p-phenylene; and Z is sodium, potassium, or ammonium, preferably sodium. Some of the preferred sulfonates of alkylphenols are commercially available, for example, sodium dodecyl benzene sulfonate, commercially available under the trade name RHODA-CAL™ DS-10 from Rhone Poulenc, North Amer. Chem. Surfactants and Specialties, NJ.

Other representative classes of surfactants include alkali metal or ammonium fatty acid salts such as alkali metal oleates and stearates, or $C_{10}$–$C_{35}$ fatty alkyl alkoxylates such as sodium lauryl sulfate; or alkali metal or ammonium alkyl sulfates, or quaternary $C_{10}$–$C_{20}$ alkylammonium salts such as cetylpyridinium chloride; or alkali metal or ammonium sulfates or phosphates of ethoxylated phenols, such as the ammonium salt of poly(oxy-1,2-ethanediyl)a-sulfo-w (nonylphenoxy); or alkali metal or ammonium salts of alkyl amphodicarboxylates, such as sodium cocoamphodipropionate.

The most preferred surfactant is sodium dodecyl benzene sulfonate.

A suitable amount of such surfactant may be any amount sufficient to form a useable aqueous dispersion, but is usually from about 0.5 to about 10, preferably from about 1 to about 6, more preferably from about 2 to about 4 percent by weight based on polymer solids.

The aqueous dispersions of the present invention can be prepared by any suitable technique, including those described in U.S. Pat. Nos. 3,360,599; 3,503,917; 4,123,403; 5,037,864; and 5,574,091, all incorporated herein by reference. The preferred process is shown in U.S. Pat. No. 5,574,091. The pressure sensitive adhesives of the invention can be produced by blending the homogeneous ethylene/α-olefin or substantially random interpolymer and other components first and emulsifying the blend or the components, or, each component can be emulsified first and then post blended.

The properties of the pressure sensitive adhesives of the invention may be customized by varying polymer molecular weight and density, amount or type of tackifier, and amount and type of plasticizer. There is a trade off between tackiness and shear bond depending on the molecular weight and density of the resin used and the amount or type of tackifier or plasticizer used. The high molecular weight copolymer gives higher shear bond but lower tackiness. The process and composition of the pressure sensitive adhesives of this invention provide a flexibility in design of the properties of pressure sensitive adhesives for different applications.

EXAMPLES

Preparation of Components for PSA Formulations

The pressure sensitive adhesive formulations of the examples were prepared by blending various polyolefin dispersions with emulsions of commercial tackifiers and plasticizing oils. The components of the PSA formulations were prepared as follows:

Preparation of Dispersions of the Homogeneous Ethylene/α-Olefin Interpolymers

The polyolefin dispersions were prepared by dissolving the ethylene-octene polymers, made by The Dow Chemical Company, in toluene to make a 25 weight percent solution based on the total weight of polymer and toluene. Details on the melt index and density of the polymers tested are provided below. Sodium dodecylbenzene sulfonate, supplied by Rhone-Poulenc as Rhodacal DS-10, is added to the solution in an amount of 2 to 4 pph (parts per hundred) by weight of the polymer. N-propanol is also added to the solution in an amount of about 5 pph of the polymer. This solution is the disperse phase. The disperse phase is pumped continuously through an arm of a 0.375 inch (0.95 cm) inner diameter stainless steel tube fitted to a tee, at a constant rate of about 16 g/min. Concurrently, water (the continuous phase) is pumped through an arm of 0.0625 inch (0.16 cm) stainless steel tubing fitted to a tee, at a constant rate of about 0.8 g/min. The two streams are merged together under conditions of shear in a small stainless steel vessel using an IKA T-25 ULTRA-TORRAX rotor-stator mixer operating at about 7000 rpm. The mixture leaving the mixing vessel is a highly viscous dispersion, wherein the water is the continuous phase. Water is then added to the highly viscous dispersion to reduce its viscosity. The toluene and n-propanol are removed from the resultant dispersion by rotary evaporation. The concentration of polymer in the polyolefin dispersion after removal of the toluene and n-propanol is typically about 50 percent of the total dispersion weight.

Four polyolefin dispersions were prepared in accordance with this procedure. The polymers utilized, and the amount of Rhodacal DS-10 surfactant utilized, are set forth in the following Table One. Each of the polymers utilized was a homogeneous ethylene/1-octene interpolymer prepared in accordance with the procedure of U.S. Pat. Nos. 5,272,236, and 5,278,272, each of which is incorporated herein by reference.

TABLE ONE

| Polymer | Density (g/cm$^3$) | Melt Index (I$_2$) | Additives | Amount of Surfactant (wt. %) |
|---------|--------|-------|-----------|----------|
| A | 0.863 | 0.5 | 500 ppm Irganox 1076, 800 ppm PEPQ | 2 |
| B | 0.902 | 30 | 600 ppm Eurucamide, 500 ppm Irganox 1076, 800 ppm PEPQ | 4 |
| C | 0.858 | 0.5 | 2000 ppm Irganox 1010 | 2 |
| D | 0.858 | 30 | 2000 ppm Irganox 1010 | 3 |

Two tackifier emulsions were used as components in the pressure sensitive adhesives of the examples.

In the first case, a commercially available emulsifier tackifier, Picconol AA101, is utilized. Picconol AA101 is an aliphatic hydrocarbon tackifier resin emulsion, available from Hercules. The emulsion is solvent free and ~50 percent solids. The softening point of the resin is ~71° C.

In the second case, an emulsion of Adtac LV, a liquid hydrocarbon having a softening point of about 5° C., available from Hercules, was prepared. The emulsion of Adtac was made by dissolving 12 g of DS-10 surfactant in 94 g of water heated to about 90° C. The DS-10 solution was added to a 1 liter glass vessel and agitated using an IKA T-25 rotor-stator mixer. 235 g of liquid Adtac LV hydrocarbon, preheated to about 90° C., was then gradually added and dispersed to form an emulsion of the tackifier in water. After all the Adtac hydrocarbon was added, the emulsion was agitated for about 10 minutes to obtain the final emulsion.

The plasticizer oil used was Kaydol Oil, commercially available from Witco.

Formulation and Testing of the Pressure Sensitive Adhesives

The composition of each formulation is given on a solids basis. The formulations were prepared through simple mixing of the formulation components. The formulations prepared are set forth in Table Two. In Table Two, a reference to a given polymer indicates that the emulsion of that polymer, as prepared above, was utilized in the pressure sensitive adhesive formulation in the indicated amount.

Adhesive films were made from the formulations using a 20 mil drawdown bar on Mylar film, and drying in an oven at 84° C. for 30 minutes. The test methods used in this preliminary investigation are as follows:

Tack: An assessment of tack was made by touching the adhesive with a finger. Values range from poor (no tack) to excellent (the tackiest sample tested, a label adhesive formulation based on DL325).

180 Degree Peel Strength: A 1 inch wide tape of the PSA adhesive on Mylar film was rolled onto a subject substrate using one back and forth pass with a 2 kg roller. The tape was then pulled off the substrate at a rate of 12 inches/min using an Instron tensiometer. The average force required for the peel was recorded. Cases in which the adhesive failed cohesively were also noted. The substrates tested were stainless steel plate, corrugated cardboard, and polypropylene panels.

178 Degree Shear Adhesion: A 1.0×0.5 inch (2.5×1.3 cm) tape of the PSA adhesive on Mylar film was rolled onto a stainless steel plate using one back and forth pass with a 2 kg roller. The time required for a 960 g weight to pull a 1.0×0.5 inch (2.5×1.3 cm) tape made from the adhesive off a stainless steel plate was recorded.

A commercial PSA (Latex DL325, an acrylate based latex, available from Dow Europe, S. A.) was also included in these tests for comparative purposes.

The pressure sensitive adhesives, and resultant properties, are set forth in the following Table Two:

TABLE TWO

|  | PSA1 | PSA2 | PSA3 | PSA4 | PSA5 | Comp. Ex. |
|---|---|---|---|---|---|---|
| Polymer A | 17.5 |  | 14.0 |  |  |  |
| Polymer B | 7.5 | 6.0 | 6.0 |  | 3.0 |  |
| Polymer C |  | 14.0 |  | 20.0 | 27.0 |  |
| Polymer D |  | 10.0 |  | 10.0 |  |  |
| Piccanol AA101 tackifier |  | 15.0 | 30.0 | 30.0 | 30.0 |  |
| Admer tackifier | 75.0 | 55.0 | 35.0 | 40.0 | 40.0 |  |
| Kaydol mineral oil |  |  | 5.0 |  |  |  |
| Finger Tack | very good | good | good | fair | fair | excellent |
| Stainless Steel Peel (lb force) (N) | 0.4 (cohesive) (1.8) | 3.6 (16) | 4.7 (21) | 5.8 (26) | 3.3 (15) | 1.0 (4.4) |
| Corrugated Peel (lb force) (N) | (0.3) (cohesive) (1.3) | 1.0 (4.4) | 0.9 (4.0) | 1.3 (5.8) | 1.9 (8.5) | 0.8 (3.6) |

TABLE TWO-continued

|  | PSA1 | PSA2 | PSA3 | PSA4 | PSA5 | Comp. Ex. |
|---|---|---|---|---|---|---|
| Polypropylene Peel (lb force) (N) |  | 2.2 (9.8) | 4.0 (18) | 3.9 (17) | 2.5 (11) | 0.8 (3.6) |
| Shear Bond (minutes) | 8 | 30 | 120 | 410 | 720 | 102 |

The results from Table Two indicate that the pressure sensitive adhesive of the invention exhibit better peel strength (stainless steel or polypropylene substrate) than the control acrylate latex. The PSA4 is a preferred, optimized formulation for shear bond and peel strength.

The present invention, including specific embodiments, has been described above. Other embodiments will be readily ascertained by one skilled in the art. Accordingly, the scope of the invention is limited only by the following claims.

We claim:

1. A pressure sensitive adhesive comprising a latex of:
   a. A blend comprising:
      i. a homogeneous ethylene/α-olefin interpolymer, and
      ii. a substantially random interpolymer of ethylene and at least one vinylidene aromatic or hindered aliphatic comonomer; and
   b. at least one surfactant.

2. The pressure sensitive adhesive of claim 1, wherein the at least one polymer is a homogeneous interpolymer of ethylene and at least one $C_3$–$C_{20}$ α-olefin.

3. The pressure sensitive adhesive of claim 1, wherein the at least one polymer is a homogeneous ethylene/α-olefin interpolymer having a density of from 0.855 to 0.90 g/cm$^3$.

4. The pressure sensitive adhesive of claim 1 in which at least one component of the blend has a molecular weight (Mw), as determined by gel permeation chromatography, of at least 30,000.

5. The pressure sensitive adhesive of claim 1 in which the substantially random interpolymer of (a)(ii) comprises ethylene and from 0.5 to 65 mole percent of at least one vinylidene aromatic or hindered aliphatic comonomer.

6. The pressure sensitive adhesive of claim 5 in which the substantially random interpolymer of (a)(ii) comprises ethylene and styrene.

7. The pressure sensitive adhesive of claim 5 in which the substantially random interpolymer of (a)(ii) comprises ethylene, styrene, and at least one $C_3$–$C_{20}$ α-olefin.

8. The pressure sensitive adhesive of claim 1 further comprising from 5 to 70 weight percent, based on the weight of the blend, of at least one tackifier.

9. The pressure sensitive adhesive of claim 1 further comprising from 5 to 90 weight percent, based on the weight of the blend, of at least one plasticizer.

10. The pressure sensitive adhesive of claim 1 in which the surfactant is sodium dodecyl benzene sutfonate.

11. The pressure sensitive adhesive of claim 1 in which the surfactant is provided in an amount of from 1 to 5 weight percent, based on the weight of the blend.

12. The pressure sensitive adhesive of claim 1, wherein the at least one homogeneous ethylene/α-olefin interpolymer comprises a lower density homogeneous ethylene/α-olefin interpolymer to which a higher density ethylene polymer has been grafted.

13. The pressure sensitive adhesive of claim 1 further comprising at least one additional polymer selected from the group consisting of natural rubber, styrene butadiene copolymer, polyacrylates, styrene block copolymers, ethylene acrylic acid copolymers, and combinations thereof.

14. The pressure sensitive adhesive of claim 1 further comprising at least one additional component, prepared by forming a first emulsion of the homogeneous ethylene/α-olefin interpolymer or substantially random interpolymer, forming a second emulsion of the at least one additional component, and blending the first emulsion with the second emulsion.

15. The pressure sensitive adhesive of claim 1 further comprising at least one additional component, prepared by melt blending the homogeneous ethylene/α-olefin interpolymer or substantially random interpolymer and the at least one additional component to form a uniform blend, and thereafter emulsifying the blend to form the pressure sensitive adhesive formulation.

* * * * *